March 27, 1956 — L. C. PEARCE — 2,739,809
FEEDING AND DELIVERY MEANS FOR COLLATING MACHINE
Original Filed Aug. 10, 1949 — 12 Sheets-Sheet 1

INVENTOR.
LEWIS C. PEARCE
BY Hudson, Boughton,
Williams, David & Hoffmann.
ATTORNEYS INVENTOR.
LEWIS C. PEARCE
BY Hudson, Boughton,
Williams, David & Hoffmann.
ATTORNEYS

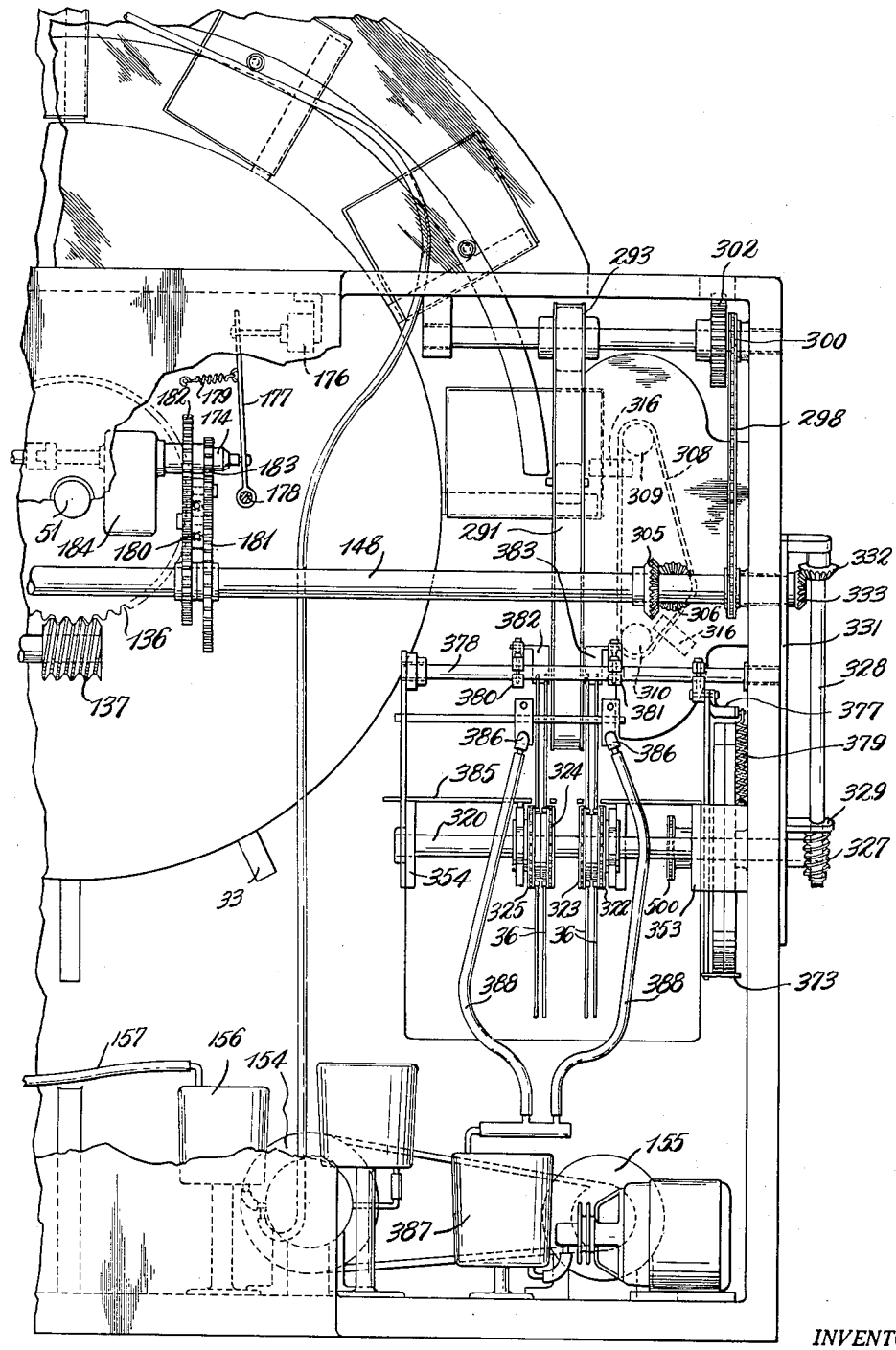

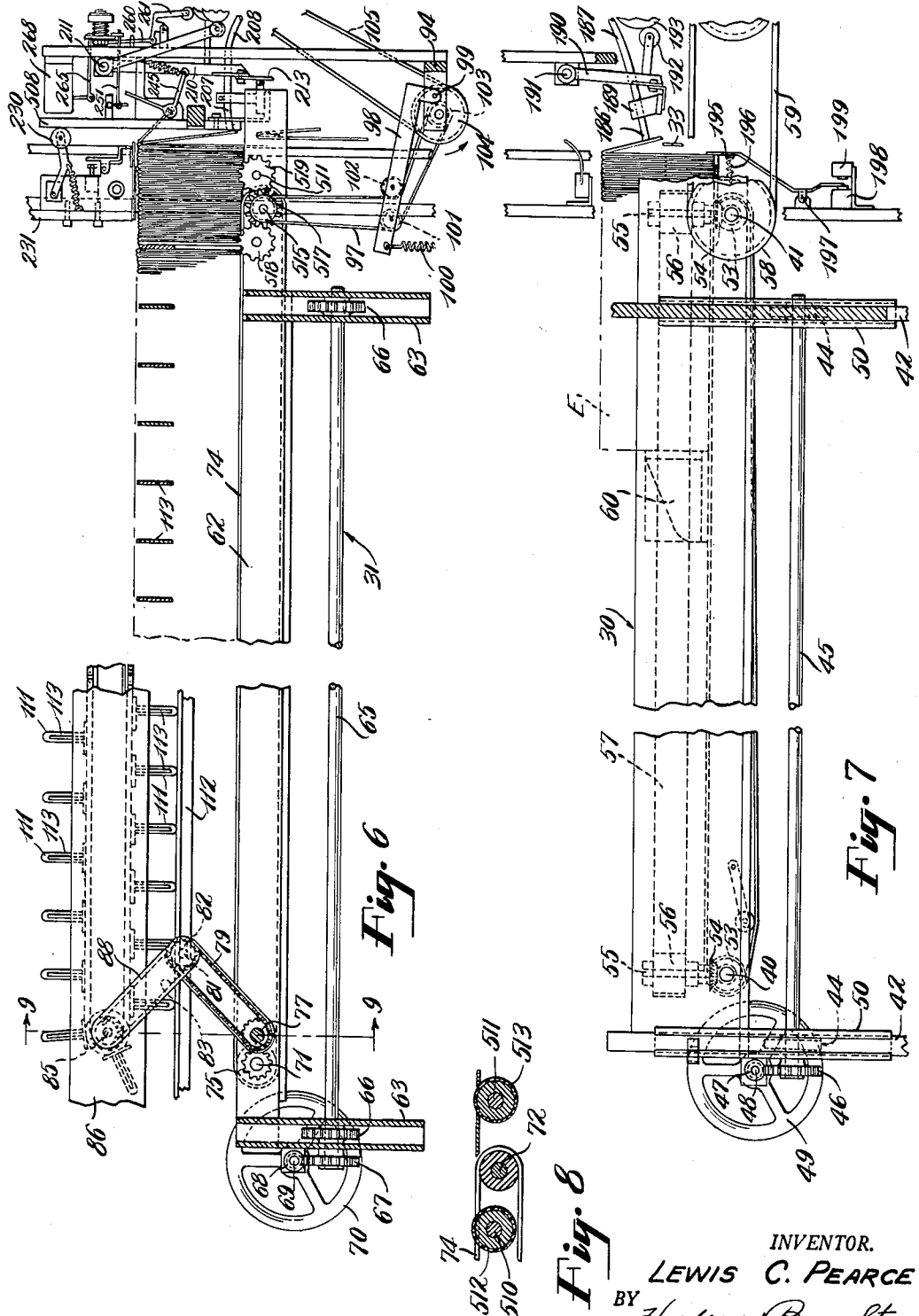

March 27, 1956          L. C. PEARCE          2,739,809
FEEDING AND DELIVERY MEANS FOR COLLATING MACHINE
Original Filed Aug. 10, 1949          12 Sheets-Sheet 7
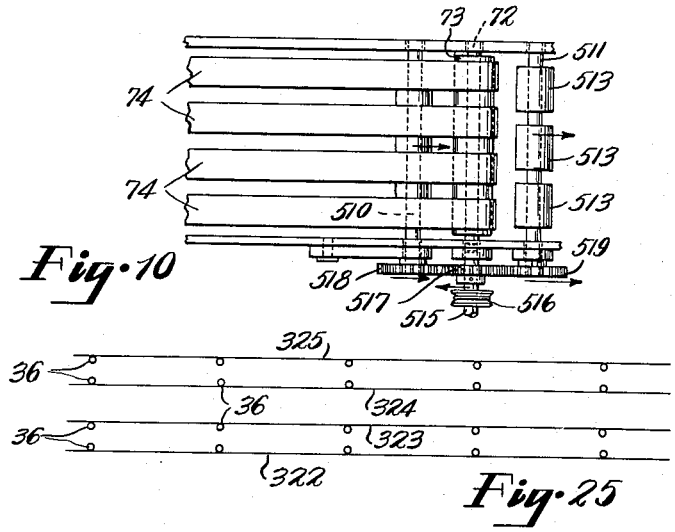
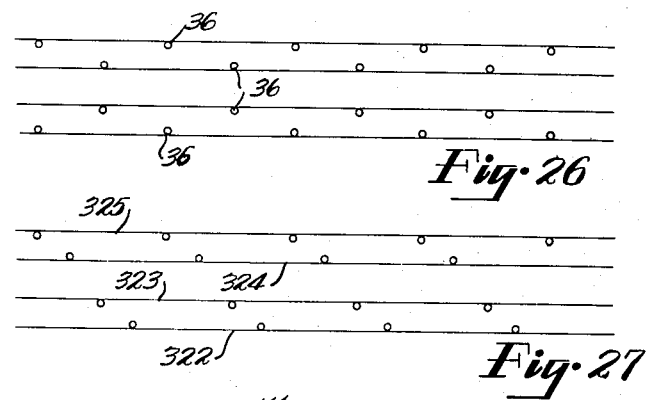
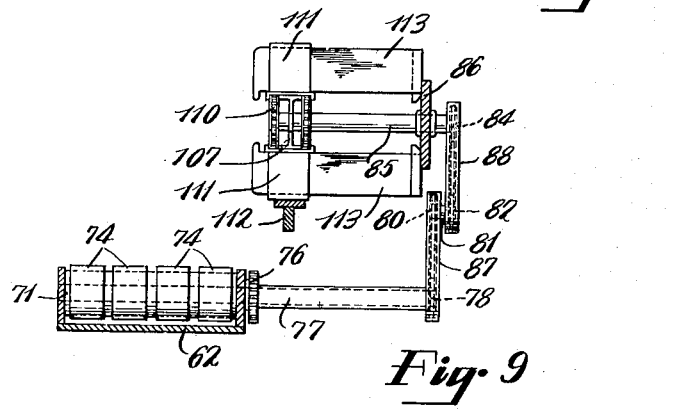
INVENTOR.
LEWIS C. PEARCE
BY Hudson, Boughton,
Williams, David & Hoffmann.
ATTORNEYS

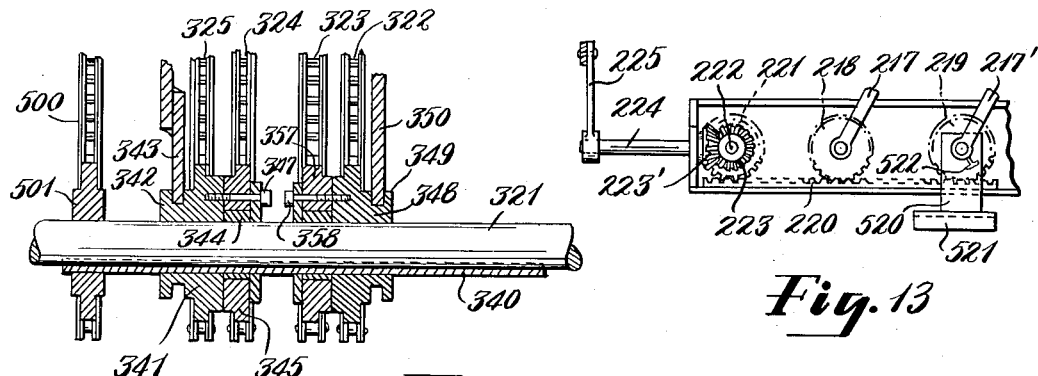
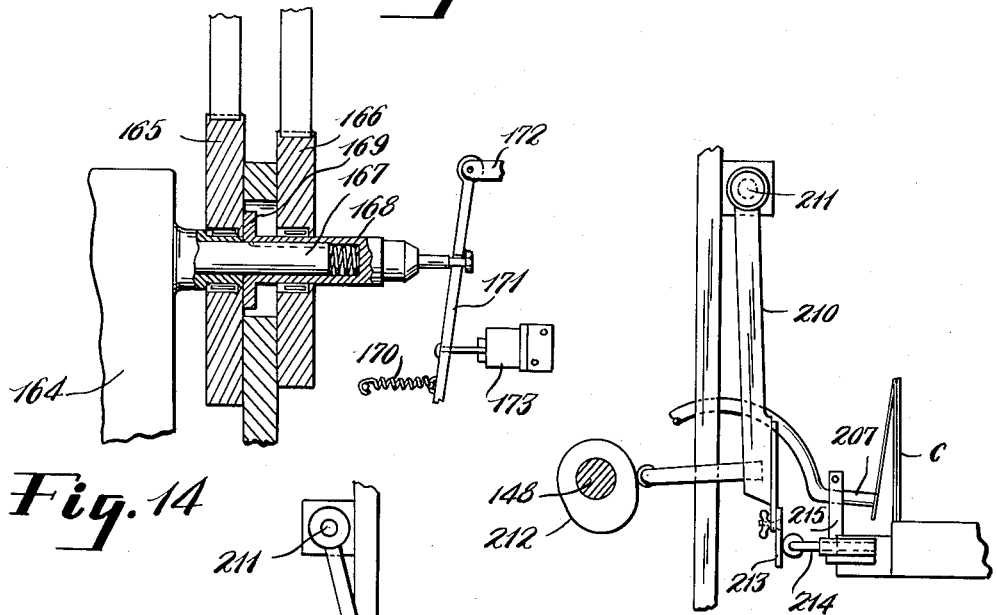
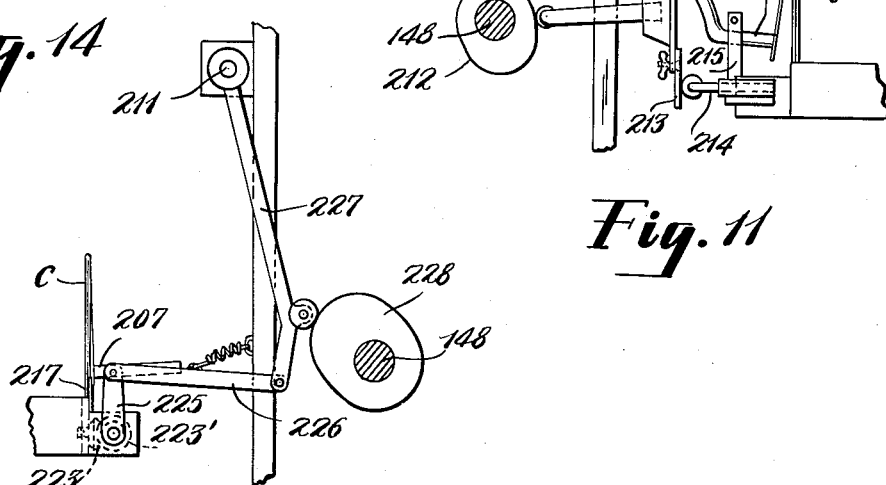

INVENTOR.
LEWIS C. PEARCE
BY Hudson, Boughton,
Williams, David & Hoffmann.
ATTORNEYS

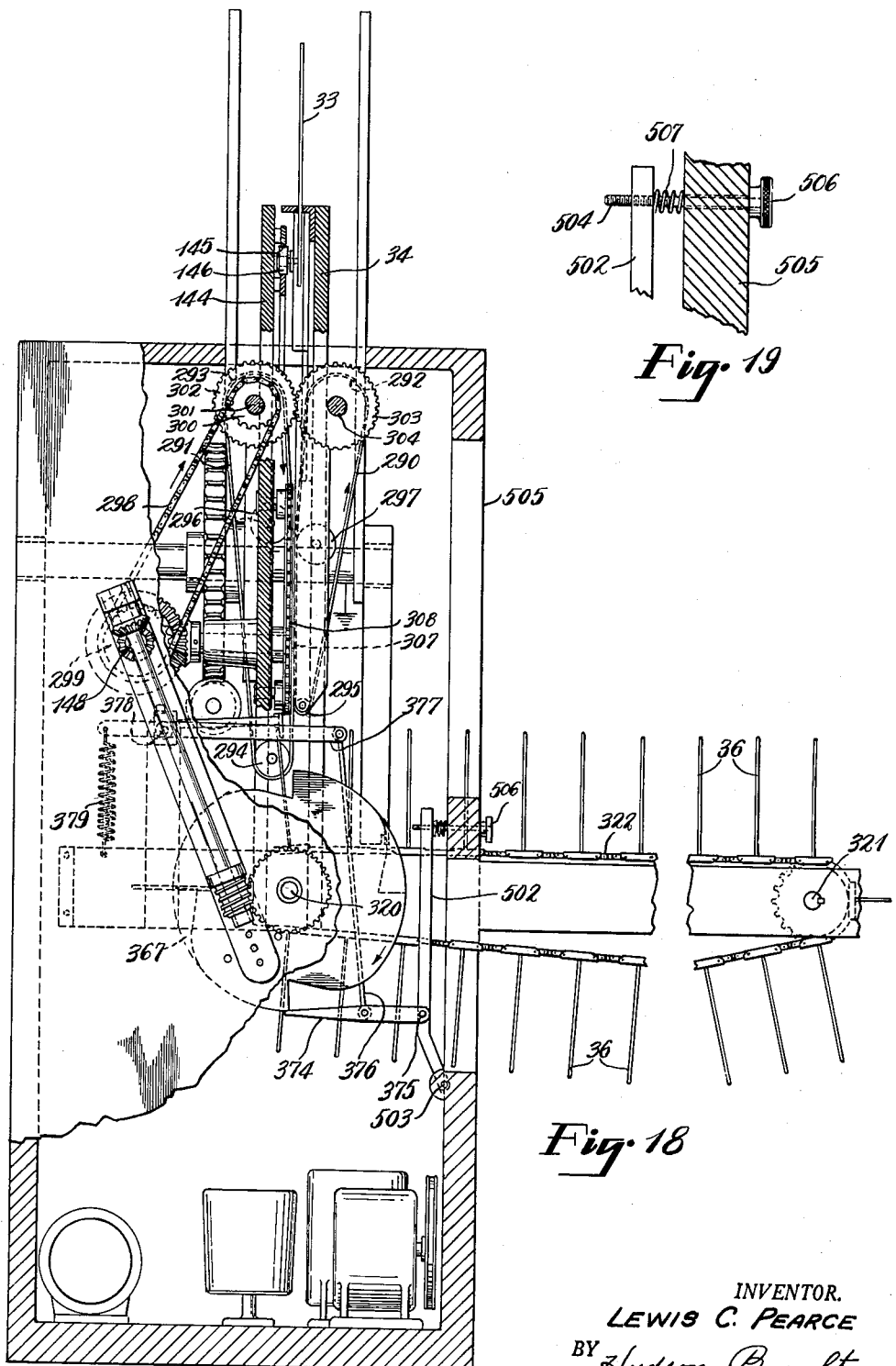

INVENTOR.
LEWIS C. PEARCE
BY Hudson, Boughton
Williams, David & Hoffmann.
ATTORNEYS

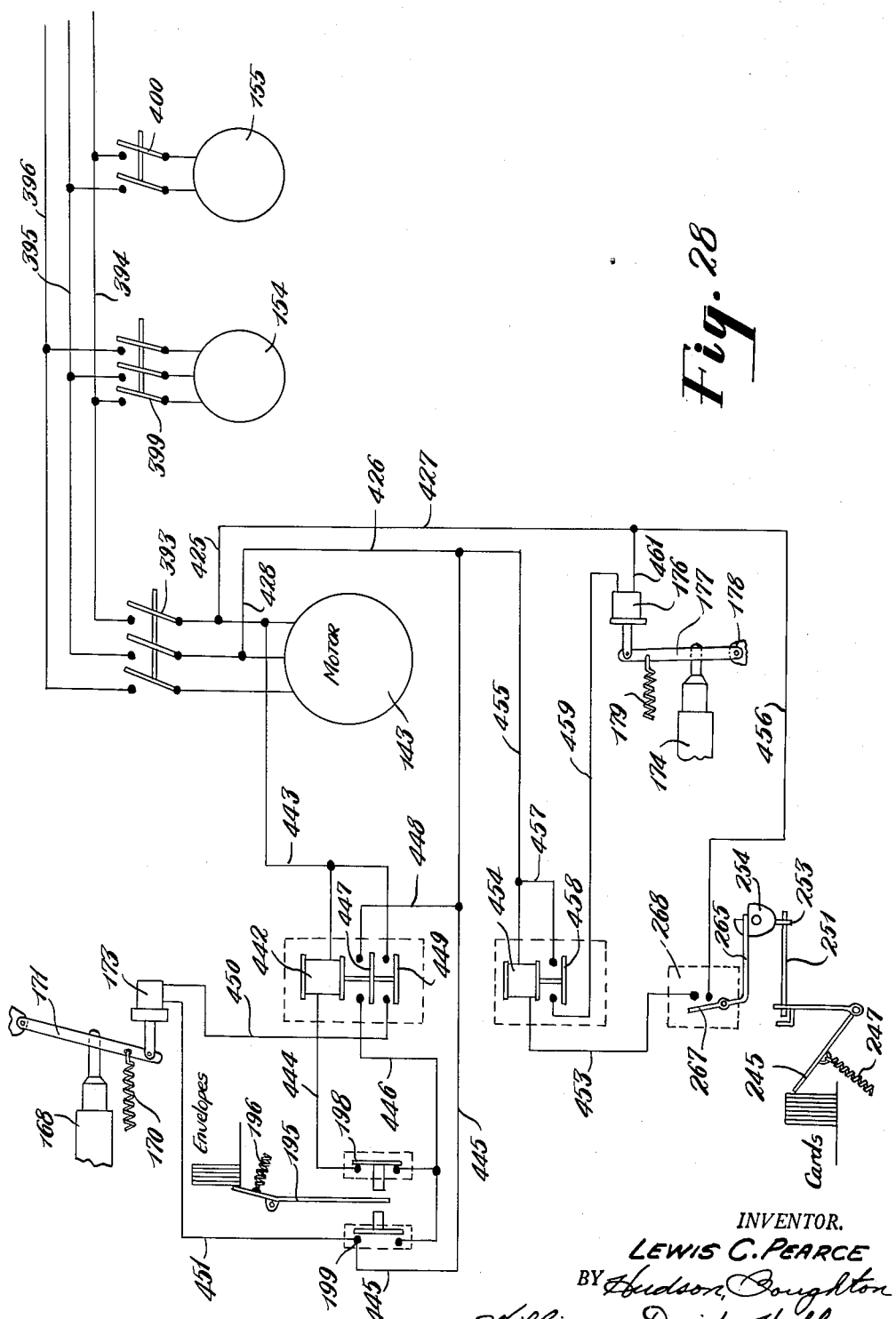

United States Patent Office 2,739,809
Patented Mar. 27, 1956

2,739,809

FEEDING AND DELIVERY MEANS FOR COLLATING MACHINE

Lewis C. Pearce, Berea, Ohio, assignor to The Pearce Development Company, Cleveland, Ohio, a corporation of Ohio Original application August 10, 1949, Serial No. 109,596, now Patent No. 2,684,848, dated July 27, 1954. Divided and this application August 14, 1951, Serial No. 241,780

12 Claims. (Cl. 271—52)

This invention relates to improvements in feeding and delivery means for collating machines. The present application is a division of my copending application Serial No. 109,596, filed August 10, 1949, entitled "Machine for Interleaving Folded Sheet Material," now U. S. Patent No. 2,684,848. The feeding means comprises a plurality of parallel conveyors for folded sheet material which are adapted to advance said material at a regulated rate to a transversely moving collating member, such as one of the radial blades of a rimless wheel revolving on a horizontal axis parallel to said conveyors, each blade being adapted to enter a fold of a piece of folded material on one conveyor and carry it transversely across the forward end of the other conveyor, thereby causing the first folded sheet to enter a fold of a piece of folded material on the second conveyor and extract it from that conveyor. After the blades bearing collated sheets move upwardly over the axis of the wheel they start downwardly and drop off the collated groups of sheets edgewise onto a delivery conveyor which is parallel to but removed from said feeding conveyors. The delivery conveyor is formed with compartments adapted to receive a plurality of groups of sheets, the number in each compartment depending upon the speed of travel of the conveyor, which is variable.

The invention is especially although not exclusively adapted for use in connection with a machine for inserting envelopes between separated pages of a folded greeting card.

One of the objects of the invention is the provision of parallel feeding conveyors, at least one of which is adjustable bodily with respect to another to bring the folds of sheets of different dimensions into radial positions corresponding with the forward edges of collating blades as they engage the folds of the sheets on the respective conveyors.

Another object is the provision of a horizontal conveyor for folded sheets on edge together with impeller mechanism embodying plates moving forward at the same speed as the conveyor engaging the pack of sheets at intervals, thereby maintaining the sheets in correct vertical position as they travel forward on the conveyor.

A further object is the provision of means for maintaining substantially constant at the forward ends of feeding conveyors the pressure of packs of folded sheet material, such as envelopes and folded greeting cards, whereby means for opening the envelope flaps or pages of folded sheets can operate to the best advantage, the preferred driving mechanism for this purpose embodying a normally operating low speed gear train and a normally inoperative high speed gear train, and means for throwing into operation the high speed train whenever the pack pressure falls to a predetermined extent.

Another object is the provision of means for collecting deposited interleaved folded sheets in groups of a predetermined number on the delivery conveyor, and means for varying that number.

Another object is the provision of means for forming compartments of variable size in the delivery conveyor.

Still another object is the provision of quickly adjustable means for varying the transverse spacing of the posts which form the said compartments.

Other objects and features of novelty will appear as I proceed with the description of that form of the invention which, for the purposes of the present application, I have illustrated in the accompanying drawings, in which Fig. 1 is a somewhat diagrammatic plan view of the machine as a whole.

Figs. 2 and 3 together constitute an end elevation of the machine looking in the direction of arrow A Fig. 1, the illustration being partly diagrammatic and partly in section.

Figs. 4 and 5 together constitute an end elevation looking in the direction of arrow B Fig. 1, the casing of the machine being broken away to better disclose the mechanism.

Fig. 6 is a partial side elevation, looking in the direction of arrow C Fig. 1, partly in section and partly broken away, showing the upper or card feed conveyor.

Fig. 7 is a view taken substantially on the line 7—7 of Fig. 2 showing the lower or envelope feed conveyor.

Fig. 8 is a vertical detail sectional view taken at the forward end of the upper feed conveyor.

Fig. 9 is an end elevational view partly in section on the line 9—9 of Fig. 6.

Fig. 10 is a plan view of the forward end of the card feed conveyor.

Fig. 11 is a diagrammatic elevational view illustrating mechanism for withdrawing the front page of a folded sheet by suction to permit a transferring blade to enter behind that page.

Fig. 12 is a detail view of cam operated oscillating means for lifting fingers into position behind the forward fold of a folded sheet in timed relation with other operations of the machine.

Fig. 13 is a diagrammatic detail view at right angles to that of Fig. 12.

Fig. 14 is a detail view, partly in section, of means for shifting the drive for a forwarding conveyor from low speed to high speed and vice versa.

Fig. 18 is an elevational view partly broken away and partly in section, looking in the direction of arrow D Fig. 1, illustrating the delivery conveyor and the means for depositing collated sheets thereupon.

Fig. 19 is a detail view of a delivery conveyor adjusting means.

Fig. 24 is a cross-sectional view on a larger scale taken substantially on the line 24—24 of Fig. 22.

Figs. 25, 26 and 27 are diagrams showing different adjustments of the delivery conveyor chains for spacing the posts dividing the conveyor into compartments of different sizes, and Fig. 28 is a wiring diagram.

Figure 1:
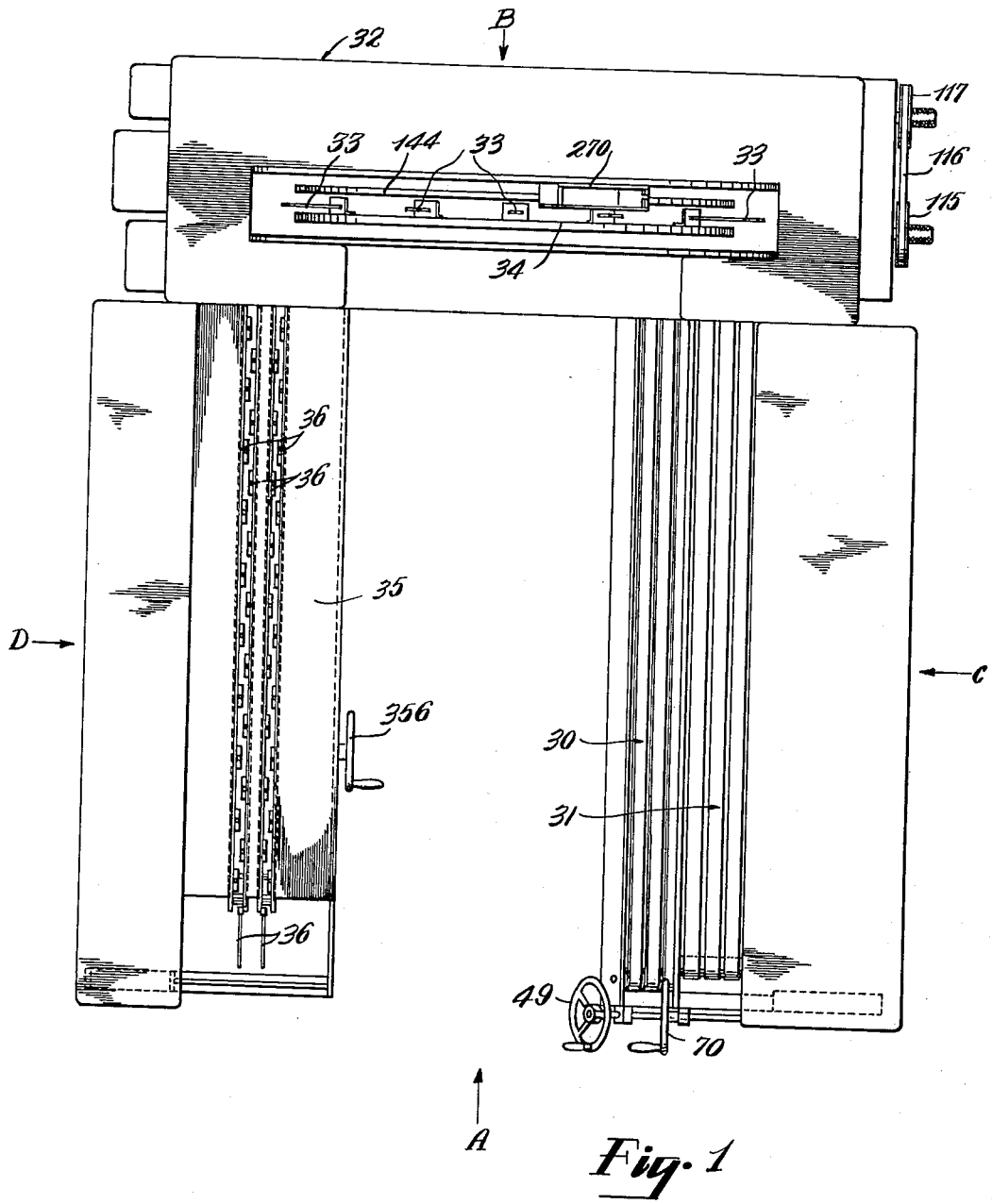

The general arrangement of the machine is best illustrated in Fig. 1 of the drawing where the lower and the upper feed conveyors are indicated generally by the reference characters 30 and 31. These conveyors carry packs of folded sheets on edge, in the illustrated case envelopes in conveyor 30 and four page greeting cards in conveyor 31. In the transfer portion of the machine generally indicated at 32, there are a series of evenly spaced metal blades 33 radially disposed in a revolving wheel 34. These blades receive envelopes and folded cards taken from the feed conveyors in that order as the blades travel upwardly. These collated sheets are carried upwardly and over the top of the wheel. As the blades move downwardly they release the collated sheets to downwardly traveling belts by which the collated units are grasped and carried vertically downward, being deposited on a delivery conveyor generally indicated at 35. The delivery conveyor carries the collated units on edge in groups of a predetermined number, the units moving forward in compartments constituted by posts 36 which move along steadily through slots formed in the delivery table. An attendant sitting at the table removes the groups of units and packs them in containers for shipment, the contents of a certain number of compartments making up a counted quantity.

Referring first to the lower feed conveyor 30, this conveyor comprises a pair of shafts 40 and 41 mounted in bearings in a frame 39 which is adjustable upwardly and downwardly upon a pair of inclined posts 42 constituting a part of the machine frame. Each of the posts 42 has a rack 43 attached thereto, and with these racks pinions 44 mesh. These pinions are keyed to a shaft 45 which also has a worm wheel 46 keyed thereto. A worm 47 meshing with worm wheel 46 is keyed at one end of a transverse shaft 48 upon which is mounted a hand wheel 49. Guides 50 C-shaped in cross-section, and secured to frame 39 embrace, posts 42. As the hand wheel 49 is turned in one direction or the other the frame 39 moves upwardly or downwardly in a direction which is perpendicular to a radius from a shaft 51 upon which the wheel 34 turns.

The two shafts 40, 41 carry rollers over which run a plurality of conveyor belts 52. Each of these shafts also carries a bevel gear 53 which meshes with another bevel gear 54 at the lower end of a shaft 55 journaled in frame 39. Upon these two shafts 55 are rollers 56, and over these rollers there runs an endless belt 57. The belts 52 and the belt 57 together form a moving trough for the support of a pack of envelopes or other folded sheets E. These belts all travel forward at the same speed by virtue of a pulley 58 on one end of shaft 41 driven by a V-belt 59 or the like. A weighted block 60 may be placed at the rear end of the pack of sheets or envelopes E to maintain them on edge in vertical planes as the conveyor travels forward.

The second conveyor, generally indicated at 31, is disposed above the conveyor 30 and has a level surface. This conveyor is mounted on vertical posts 61 rigid with the machine frame, for adjustment in a manner similar to that provided for conveyor 30. The frame 62 of the upper conveyor carries elongated C-shaped guides 63 which embrace the posts 61 and racks 64 fastened to those posts. A shaft 65 is journaled in frame 62 and carries pinions 66 which mesh with the racks. On the shaft 65 there is also mounted a worm wheel 67 which meshes with a worm 68 on a transverse shaft 69 journaled in frame 62 and carrying a hand wheel 70. As the wheel 70 is turned in one direction or the other, frame 62 is adjusted up or down upon the vertical posts 61.

In the frame 62 there are journaled two conveyor shafts 71 and 72 which carry rollers 73 over which run a plurality of endless belts 74. Shaft 71 at one end carries a gear 75 which meshes with a gear 76 on shaft 77, Fig. 6. On the latter shaft there is a sprocket 78 for a chain 79 which runs over a sprocket 80 that is keyed to a shaft 81 which carries a second sprocket 82. A second chain 83 runs over this latter sprocket and a sprocket 84 on a shaft 85 which is journaled in a horizontal frame member 86 of the machine. Two housings 87 and 88 enclose the chains 79 and 83 and their sprockets, and are oscillatably mounted on the shafts 77, 81 and 85. When the frame 62 of the upper feed conveyor is adjusted up or down as previously described, drive from shaft 85 to the shaft 77 and thence to the shaft 71 of the conveyor is not affected in any way, the shaft 81 moving toward or away from a line joining shafts 77 and 85.

On both sides of the roller on forward shaft 72 there are rubber surfaced wheels mounted on shafts 510 and 511 which are parallel to shaft 72, the tops of these wheels normally projecting slightly above the surfaces of belts 74. Wheels 512 on shaft 510 are narrow in order that they may project upwardly between adjacent belts 74. Wheels or rollers 513 on shaft 511 are relatively broad. These wheels 512 and 513 are driven at a surface speed somewhat higher than the speed of belts 74. They engage the unfolded edges of the sheets carried by the conveyor, break them apart if they are inclined to stick together, and urge them forward at least as far as the upper portions of the folded sheets. The drive for these rubber faced wheels is effected in such a way that the adjustment of the conveyor up and down does not interfere with the action of the drive.

As indicated in Figs. 10 and 6 there is supported in the frame in the same vertical plane with shaft 72 and spaced axially therefrom, a short shaft 515 carrying a pulley 516 over which runs a belt 97. An arm 98 pivoted at 99 to a fixed bracket 94 and biased downwardly by spring 100, carries two idlers 101 and 102 over which the belt runs on its way to a pulley 103 mounted on a shaft which is journaled in bracket 94. On this same shaft a larger pulley 104 is fixed and is driven by a belt 105 from any convenient rotating part of the machine. Obviously as the conveyor frame 62 is adjusted upwardly or downwardly the arm 98 swings on its pivot and the spring 100 takes up the slack in the belt.

On shaft 515 there is a spur gear 517 which meshes with spur gears 518 and 519 on shafts 510 and 511. Gear 517 turns in the counterclockwise direction, thereby driving both the gears 518 and 519 with their shafts in the clockwise direction. As previously indicated shafts 510 and 511 are so mounted that the tops of the wheels 512 and 513 stand slightly above the upper surfaces of belts 74. Preferably the bearings for these shafts are carried in supports which are adjustable vertically to a limited extent so as to vary the effect of the rubber surfaced wheels somewhat if desired, more especially to compensate for wear on the surfaces of the wheels.

Figure 2:
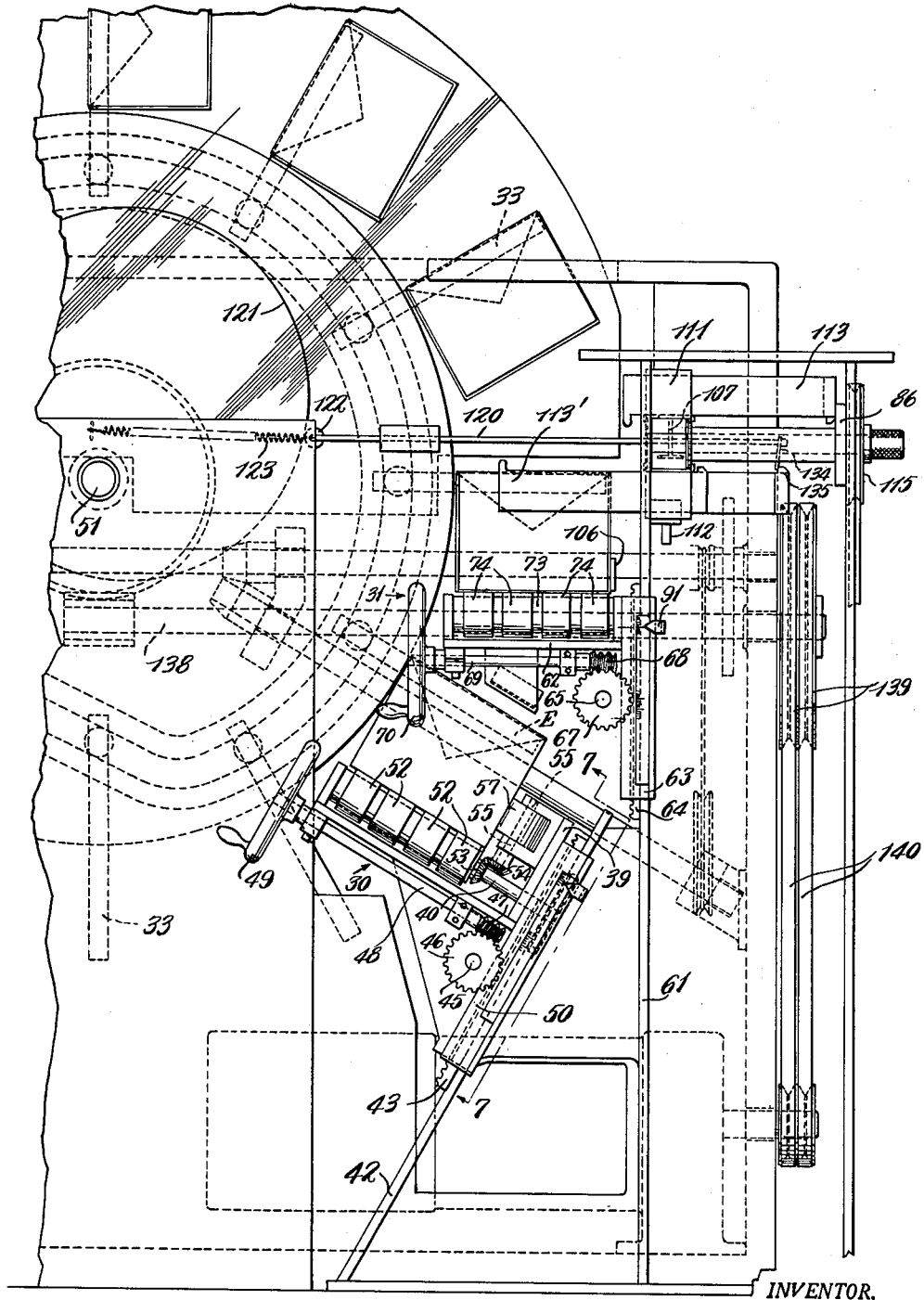

Along one side of conveyor 31, movable upwardly and downwardly with the frame 62, there is a side wall 106, Fig. 2, against which a side edge of each sheet abuts. At the forward end of the conveyor the sheets are jogged against wall 106 by conventional means not herein disclosed.

Greeting cards may vary considerably in thickness and may include ribbons and other accessories which appreciably increase their thickness in certain areas. They are accordingly difficult to maintain in good order when fed on edge. On this account partially I provide an impeller mechanism arranged to engage the pack of sheets at intervals and traveling forward with the conveyor at conveyor speed. This impeller mechanism will now be described.

Shaft 85 in addition to its mounting in the frame member 86 extends through and is journaled in a frame member 107 of I-beam cross-section, Fig. 9. A similar shaft 108 is disposed at the forward end of the impeller. On both of these shafts two sprockets 109 are secured and carry a pair of endless chains 110. At regularly spaced intervals these chains carry narrow housings 111. In the upper run of the chains these housings rest upon I-beam 107, while in the lower run they rest upon a T-bar 112. In each housing there is a thin plate 113 which may be slid from its normal position illustrated in Fig. 9 outwardly into position in the space above conveyor 31 as indicated at 113' in Fig. 2. Projections at the two ends of plates 113 prevent them from being moved out of the housings 111 in either direction. When the conveyor 31 is being loaded a number of folded sheets is placed on the conveyor belts 74 and a plate 113 is drawn out manually from its housing 111 by the operator directly behind the sheets so deposited. The next group of sheets is similarly arranged on the conveyor and a second plate pulled out to hold them in position on edge. This is continued until the conveyor is loaded sufficiently for the time being. The conveyor belts 74 are driven from the impeller by the connections previously described, and at the same speed. When a plate 113 approaches the forward end of its travel a rod 120, which is reciprocated by a cam 121 on shaft 51, a follower 122 on the rod and a retracting spring 123, causes a depending lip 134 on the rod to engage a projection 135 on the plate and return the latter to its original position in its housing.

The drive for the impeller mechanism is transmitted to the shaft 108 upon which the forward sprockets for chains 110 are fixed. This shaft 108 carries a split pulley 115 for a V-belt 116 which runs over a second split pulley 117 on a shaft 118 journaled in the machine frame. The halves of these split pulleys 115 and 117 may be adjusted toward and away from each other so as to vary the normal speed of shaft 108 within certain limits.

Figure 3:
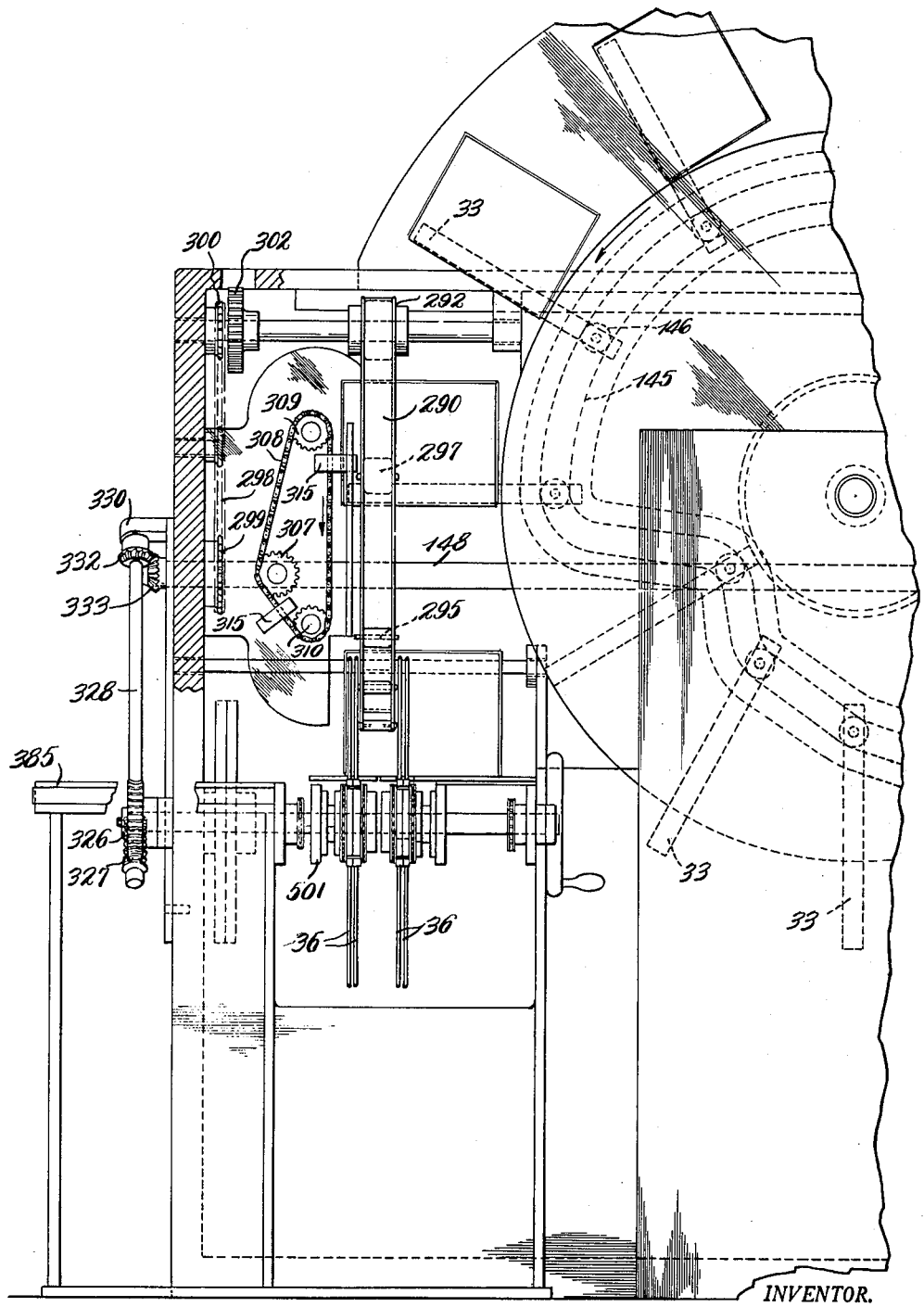
Figure 4:
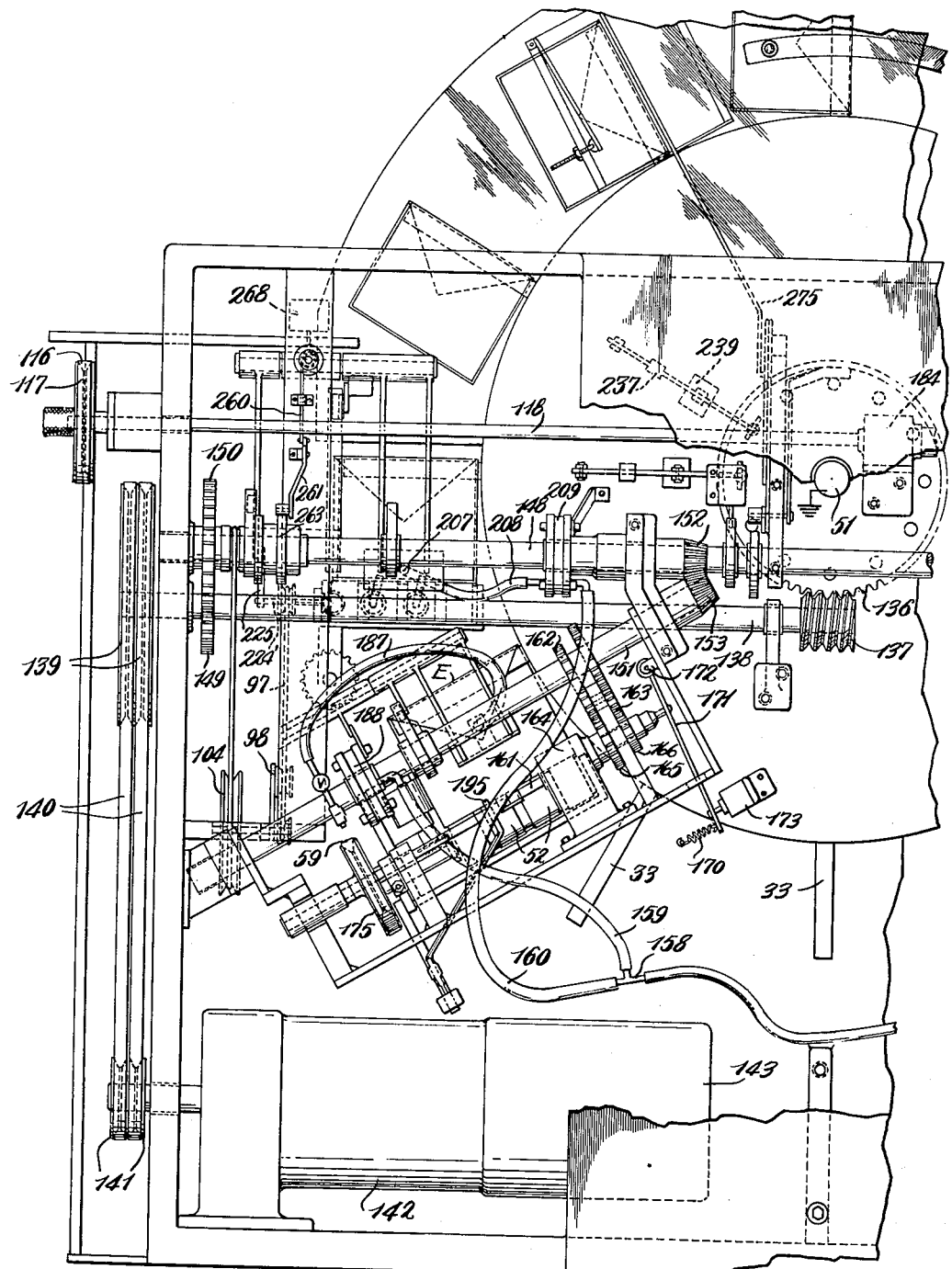

The blades 33 are slidably mounted in a wheel 34 revolving with shaft 51. This shaft carries a worm wheel 136 which meshes with a worm 137 that is pinned to a shaft 138. On its outer extremity this shaft has one or more pulleys 139 which are driven by V-belts 140 from small pulleys 141 that are mounted on the output shaft of a gear reducer 142 which takes power from an electric motor 143. Adjacent to the revolving wheel 34 there is a fixed plate 144, Fig. 18, which is provided with tracks forming a box cam 145 in which travels a follower wheel 146 that is mounted on the inner end of each blade. For the greater part of its length this box cam 145 is circular to cause the blades 33 to project a constant distance from the periphery of the wheel. On the down-going side of the wheel however, the cam track is so formed, as illustrated in Fig. 3, as to retract the blade rapidly into the wheel and then force it outwardly again.

Above shaft 138 there is a shaft 148 which extends across the entire width of the machine. It is driven by gears 149 and 150. A diagonally disposed shaft 151 takes its drive from shaft 148 by means of bevel gears 152 and 153. A suction pump 154, Fig. 5, driven by a motor 155 induces low pressure in a reservoir 156 from which a flexible conductor 157 leads to a T connection 158, and thence by conductors 159 and 160 to positions adjacent the forward ends of the lower and upper conveyors 30 and 31 respectively. A shaft 161 parallel to shaft 151 is arranged to be driven from the latter shaft normally through a low speed gear train 162 and at times through a high speed gear train 163, and in either case through a reducing gear box 164. The final gears 165 and 166 of the two trains 162 and 163 are free to turn relatively to the input shaft 167 of gear box 164. A sleeve 168 slidably keyed to shaft 167 carries a disk 169 provided with friction material on both surfaces. Thus when the sleeve 168 is shifted to the left, as viewed in Fig. 14, gear 165 is frictionally connected with shaft 167 through the intermediacy of disk 169 and sleeve 168, and when the sleeve is shifted toward the right to provide frictional connection between disk 169 and gear 166 drive is communicated from that gear to shaft 167.

Sleeve 168 is shifted toward the left by tension spring 170 working upon a lever 171 pivoted to a stationary bracket 172 whenever a solenoid 173 is deenergized. On the other hand, when this solenoid is energized it pulls the lever 171 to the right against the action of spring 170, bringing disk 169 into frictional engagement with gear 166, thereby shifting from low speed to high speed. Shaft 161 carries a pulley 175 over which the belt 59 runs. By the means indicated therefore the conveyor belts 52 and 57 of the lower conveyor are driven either at normal speed or high speed, dependent upon the action of solenoid 173.

In a similar manner the driving speed of the impeller chains 110 and of the conveyor belts 74 is controlled by a solenoid 176 working upon a lever 177 pivoted at 178 against the action of a tension spring 179 for shifting a sleeve 174 similar in function to the above mentioned sleeve 168. Low and high speed gear trains 180 and 181 take drive from shaft 148 for continuously rotating the final gears 182 and 183 of the trains which are loose upon the input shaft of a reduction gear unit 184 similar to unit 164. The gear shift in this instance may be similar to that illustrated in Fig. 14 and previously described.

Figure 15:
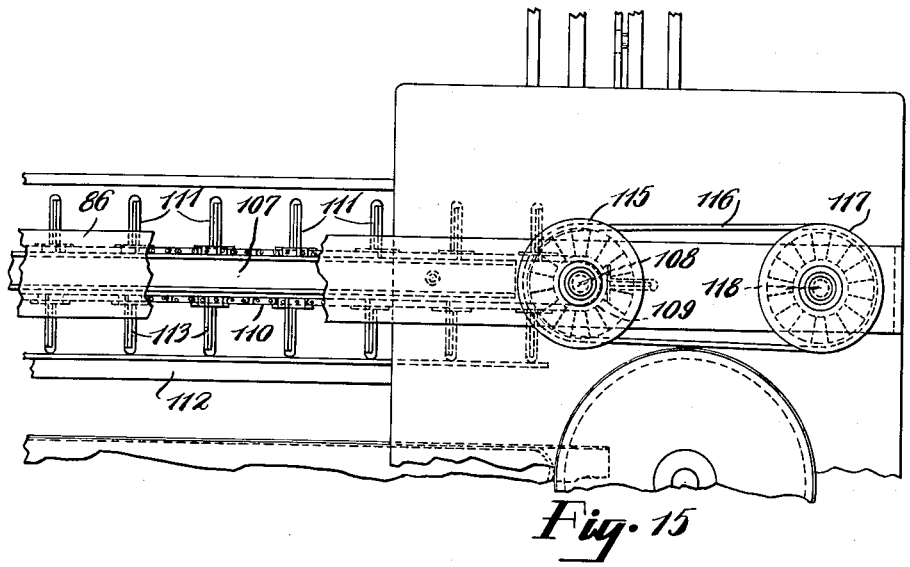
Fig. 15 is a fragmental elevational view of the upper feed conveyor showing the impeller above that conveyor.
Figure 20:
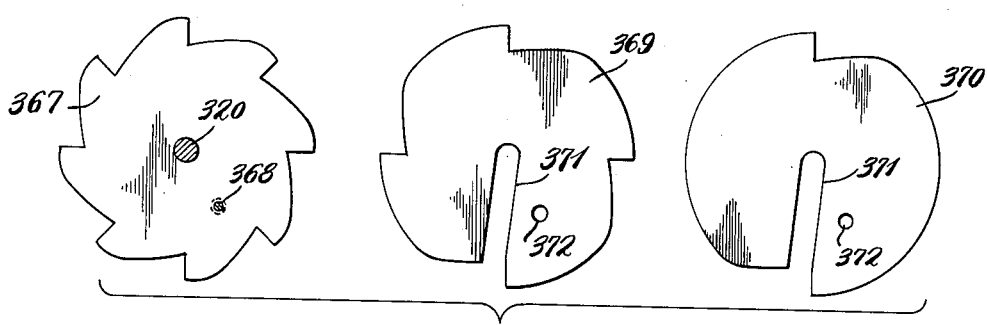
Fig. 20 is a detail view showing a trigger actuating cam and a pair of masks for use alternatively with said cam to determine the frequency of the trigger actions effective upon the posts of the delivery conveyor.

The output shaft of gear reducer 184 is shaft 118 upon which is keyed split pulley 117 previously mentioned. This pulley through belt 116, Fig. 15, drives split pulley 115 that is keyed to drive shaft 108 for impeller chains 110 of the upper or folded card conveyor.

Just before a blade 33 reaches the position indicated in Fig. 7 the flap of the foremost envelope in the pack is drawn outward or opened up by means of a suction nozzle 186 on the end of a flexible hose 187 extending from a rotary valve 188, the rotating element of which is driven by shaft 151. The opposite side of this valve is connected by flexible tubes 159 and 157 to the suction source 156 previously described. Suitable means are provided for advancing and retracting the nozzle 186 toward and away from proximity with the foremost envelope of the pack in properly timed sequence, one such means being illustrated somewhat schematically in Fig. 7, where the nozzle 186 is carried in a bracket 189 mounted on a lever 190 pivoted at 191 to a frame member, the lever swinging back and forth because of the action of a follower 192 on the peripheral surface of a cam 193 which makes one turn for each cycle of the machine. Thus control of the flap opening action is effected not only by the turning on and off of the suction through valve 188 but also by the back and forth movement of the suction nozzle.

The forward end of the pack of envelopes E bears at its lower edge against a feeler lever 195 which is urged rearwardly by a tension spring 196. As diagrammatically indicated in Fig. 7 this lever is pivotally mounted at 197 on a convenient frame part. Below the pivot an arm of the lever extends between two microswitches 198 and 199, both of which it is adapted to operate. The normal or low speed drive selected for conveyor belts 52 and 57 is somewhat below the speed necessary to maintain the desired pressure of the pack against the feeler lever 195. When the pressure decreases sufficiently to enable spring 196 acting upon lever 195 to operate switch 199, the high speed drive is brought into action by the energization of solenoid 173 and it remains in action until the pressure of the pack increases sufficiently to swing the lower end of the lever over against switch 198. The circuit through the solenoid is thereby broken and the lever 171 swings under the influence of spring 170 to bring gear train 162 into operation for low speed drive. An appreciable length of time is required to effect the swing of the lever from switch 199 to switch 198 and vice versa. Consequently hunting action is avoided.

In order to permit a blade to enter the greeting card, the foremost page of the card must be drawn forward or opened up. This is accomplished by means of a suction nozzle 207 on the end of a flexible tube 208 which extends to one stationary side of a rotary valve 209 driven by shaft 148. The opposite stationary side of the valve is connected through flexible conductor 160 to union 158 and thence by tube 157 to the suction reservoir 156.

Suitable means is provided also for causing the suction nozzle 207 to move back and forth away from and into the range of the foremost leaf of the card. Such a means is illustrated in Fig. 11 where 210 is an arm that is pivoted at 211 to a part of the frame of the machine. It swings back and forth in response to the action of a cam 212 carried by shaft 148. At its lower end it carries a plate 213 which bears against a roller on a spring pressed plunger 214 upon which is mounted a bracket 215 to which the nozzle 207 is clamped. Suction is applied to the moving nozzle 207 of course at precisely the correct time in the cycle and broken shortly before the blade 33 with its envelope reaches the upper fold of the card.

Directly after the suction nozzle 207 becomes effective to draw out the lower edge of the foremost leaf of the foremost card, a pair of metal fingers 217 and 217' swing up in front of the second leaf of the foremost card just prior to the time the blade 33 enters the space between that leaf and the foremost leaf. These fingers are fixed with respect to a pair of gears 218 and 219 which mesh with a rack 220. A gear 221 on a short shaft 222 also meshes with rack 220. A bevel gear 223 on shaft 222 meshes with a second bevel gear 223' on an oscillatable shaft 224 provided with a crank arm 225, Figs. 12 and 13. Crank 225 is connected by a link 226 with an arm 227 pivoted at 211 to a frame part, which is swung back and forth by a cam 228 on shaft 148. In order that the fingers 217 and 217' may operate to the best advantage it is desirable to spread them apart more or less for cards of different sizes. Provision for such adjustment is shown diagrammatically in Fig. 13, where the shaft for gear 219 is shown mounted in a block 520 which is adjustable back and forth in a guide 521. Of course movement of block 520 in its guide while rack 220 remains stationary will change the angle of finger 217'. That finger may be again disposed parallel to finger 217 however by loosening a setscrew 522, swinging finger 217' around into parallelism with finger 217 and again tightening setscrew 522.

As previously stated the drive from shaft 118 to the upper conveyor may be adjusted within certain limits by adjustment of the split pulleys 117 and 115 so as to compensate for different thicknesses of cards, due in some cases to accessories attached thereto. There is also provided means for shifting from low speed drive to high speed drive when the pressure of the pack behind the foremost card decreases to a predetermined extent and maintaining the increased speed for a predetermined number of cycles and then reshifting back to low speed, thereby avoiding any hunting action. A means for accomplishing this purpose in conjunction with solenoid 176 and associated parts illustrated in Fig. 5, is shown in detail in Figs. 16 and 17.

A feeler lever 245 is pivotally mounted in the frame at 246. It bears at one end against the foremost card of the pack near the upper edge of the latter. A tension spring 247 holds the feeler against the pack. The speed of the conveyor, being set somewhat below the speed necessary to maintain the required feeding pressure in the pack, a decrease in pressure to a predetermined extent enables spring 247 to swing lever 245 counterclockwise, causing an arm 248 rigid with the lever to operate through a link 249 to swing an arm 250 clockwise, thereby retracting a plunger 251 pivotally connected with the latter arm. This plunger is guided by a perforation 252 in a frame member. Its forward end forms a stop for a pin 253 which projects radially from a cam 254 that is loose upon a spindle 255 mounted in the frame. On one side of the cam 254 there is a fiber friction disk 256, which is thus disposed between the cam and a ratchet wheel 257 that is also loose upon the spindle. A compression spring 258 surrounding the spindle bears against cam 254, its pressure being adjustable by means of a knurled thumb nut 259. 260 is a vertically reciprocable guided pawl which is given one reciprocation for each cycle of the machine through the intermediacy of a rocking arm 261 pivoted to a frame member at 262 and actuated by a cam 263 on a shaft 148. Cam 254 has a low spot 264 which is normally in contact with a plunger 265 that is guided for reciprocation in the frame and is pivotally connected at 266 with the lower end of a crank 267 forming an operating member for a microswitch 268.

Figure 16:
Fig. 16 is a diagrammatic elevational view of delayed action mechanism for shifting a control for the folded card conveyor to speed up the action of the drive for the conveyor through a predetermined number of cycles of the machine or a multiple of that number.
Figure 17:
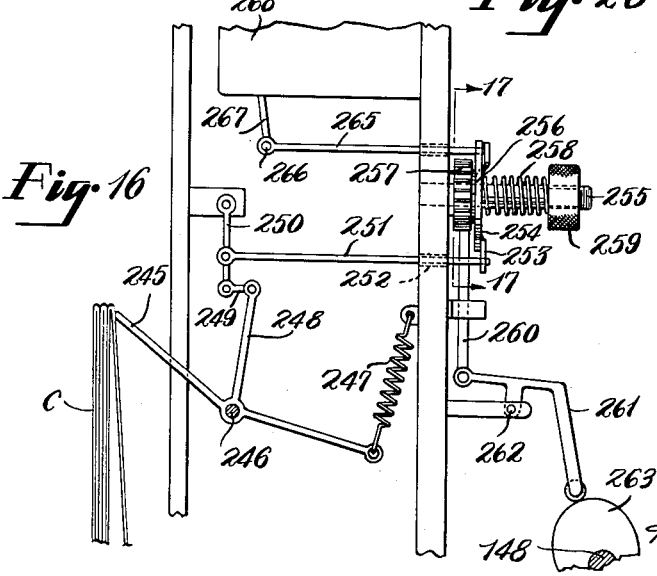
Fig. 17 is a detail sectional view taken substantially on the line 17—17 of Fig. 16.

With the parts in the positions shown in Figs. 16 and 17 switch 268 is open. Pawl 260 is continuously reciprocated, and ratchet 257 actuated, but because of plunger 251 the intermittent motion of ratchet wheel 257 is not communicated to cam 254 through the friction disk 256. When however the pressure in the pack of cards C decreases beyond a predetermined point, spring 247 causes plunger 251 to be retracted out of the path of pin 253. On the next reciprocation of pawl 260 the movement of ratchet 257 is communicated to cam 254 through the friction disk 256. This shifts plunger 265 to the left, Fig. 16, closing switch 268 and completing a circuit through solenoid 176 which effects a shift to high gear. Cam 254 continues a step by step rotation of the direction of which is indicated by the arrow in Fig. 18. The number of teeth in the ratchet 257 determines the number of cycles of the machine before the low spot 264 again engages plunger 265. If in the meantime increased pressure of the pack resulting from the high speed of the conveyor has overcome spring 247 to the extent necessary to again advance plunger 251 to the illustrated position the rotation of the cam ceases and the shift is made back to the low speed gear train. If on the other hand the plunger 251 remains retracted a second revolution of the cam takes place and the high speed gear train remains in action throughout the second revolution. An approximately constant pressure is maintained in the pack of cards without any hunting action taking place.

As each of the blades 33 descends on the down-going side of the wheel 34, carrying with it a pair of collated sheets, folded edges down, it enters the space between the upper ends of two endless belts 290 and 291 vertically disposed and running over pulleys 292 and 293 respectively. The lower end of belt 291 runs over an idler 294, while the lower end of belt 290 runs over a small idler 295 disposed somewhat above idler 294. The upper portions of the belts are spaced apart to give easy access between them for the blades 33 with their collated sheets, but the belts are caused to approach each other by idler rollers 296 and 297 which are disposed out of horizontal alignment as shown in Fig. 18. The two belts travel close together below idler rollers 297 so as to grip the collated units especially while the blades 33 are being retracted into the wheel by the box cam 145, Fig. 3. These belts are driven by an endless chain 298 running over a sprocket 299 on shaft 148 and a sprocket 300 on a shaft 301 which carries pulley 293 and also a gear 302 meshing with a mating gear 303 on a shaft 304 which carries pulley 292. Shaft 148 carries additionally a bevel gear 305, Fig. 5, which meshes with a second bevel gear 306 on the same shaft with sprocket wheel 307 that drives an endless chain 308 which also runs over vertically spaced sprockets 309 and 310.

The rollers 296 and 297 and the rollers 294 and 295 tend to bring the belts 290 and 291 into close contact throughout their vertical runs. The belts of course are somewhat yieldable so that the blades with their collated card and envelope units may pass between them. Similarly the disposition of rollers 296 and 297 at somewhat different levels avoids binding action upon the blades and collated sheet units as they pass downwardly.

While the blades are being withdrawn from the collated units during their downward travel there is a natural tendency for the units to move laterally along with the blades. This tendency is overcome in my construction by gripper fingers which are caused to engage each unit before the withdrawal of the blade begins and to continue the gripping action until the blade is completely withdrawn. This gripper means is indicated at 315, 316 in Figs. 3 and 5. Two sets of grippers are mounted at opposite points on the chains 308. Means are provided for operating these jaws at the proper time in the cycle to grip a sheet as it starts to travel vertically downward between the belts 290 and 291 and to release it when the blade is withdrawn.

*The delivery.*—The delivery comprises two shafts 320 and 321 disposed at opposite ends of the delivery table and carrying sprockets over which run four chains 322, 323, 324 and 325. Shaft 320 projects through the casing where it is supplied with a worm wheel 326 keyed to the shaft, this worm wheel meshing with a worm 327 carried by shaft 328 which is journaled in bearings 329 and 330 carried by a bar 331 that is perforated to receive shaft 148 and is adapted to swing about that shaft through a limited angle. The upper end of shaft 328, carries a bevel gear 332 which meshes with a bevel gear 333 on shaft 148. Near the lower end of bar 331 there is a hole through which a stud 334 extends and is threaded into one of several holes 335 in the machine frame. Several worm wheels 326 of different sizes are supplied with the machine, and the worm 327 may be caused to mesh with any one of said wheels when the stud 334 is mounted in the proper threaded hole. Thus different speeds of rotation may be imparted to shaft 320.

Figure 21:
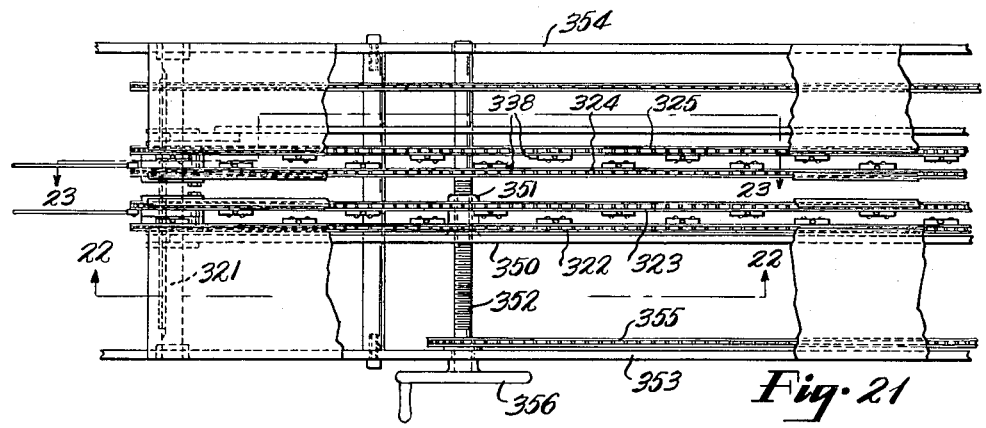
Fig. 21 is a fragmental plan view, partly broken away, of the delivery conveyor.
Figure 22:
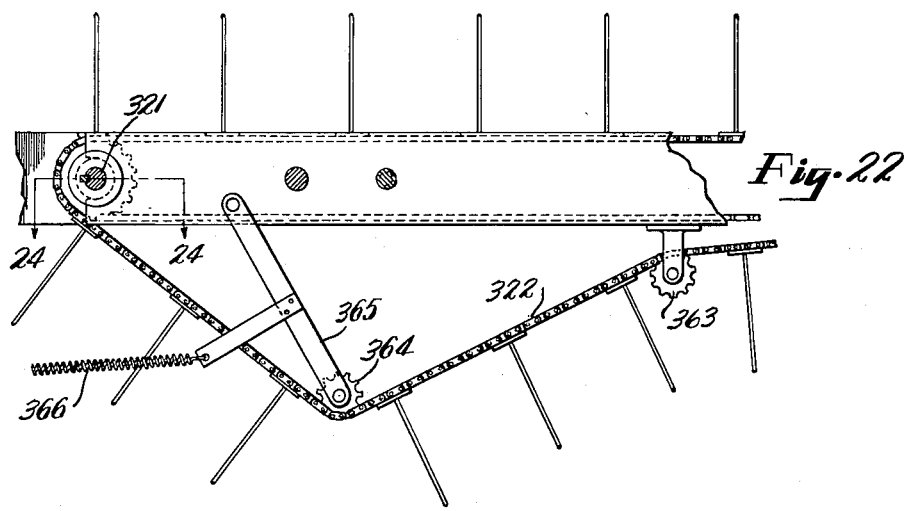
Fig. 22 is a vertical sectional view taken substantially on the line 22—22 of Fig. 21.

Each of the chains 322, 323, 324, 325 carries a series of evenly spaced slender posts 36 preferably mounted rigidly in blocks 338 which are carried laterally by certain links of the chain, see particularly Fig. 21. The chains move continuously at a slow rate of speed. These posts define pockets in the delivery conveyor. In order to vary the size of the pockets the chains are adjustable relative to each other according to the diagrams of Figs. 25, 26 and 27. The posts of the four chains may be disposed in transverse rows as illustrated in Fig. 25. Secondly, the chains 323 and 324 may be adjusted forwardly or backwardly to dispose the posts on those chains half way between the posts on chains 322 and 325, as indicated in Fig. 26. Thirdly, the chains 322 and 324 may be moved backwardly from their Fig. 26 position to the Fig. 27 position to effect a spacing one quarter that of Fig. 25.

On shaft 320 there is keyed a sprocket over which runs a chain 500. A sprocket 501 for this chain is mounted on shaft 321 and locked thereto by a key 340. The sprockets for chains 322, 323, 324 and 325 on shaft 320 are loose upon that shaft, but the corresponding sprockets on shaft 321 are keyed to the shaft as will presently appear. Shaft 321 is therefore the drive shaft for the conveyor chains.

The lateral spacing between chains 322 and 323 is maintained constant, as is the spacing between chains 324 and 325, but the two chains 322 and 323 may be adjusted together laterally with respect to the chains 324 and 325. Referring to Fig. 24, sprocket 341 for chain 325 is fastened to shaft 321 by elongated spline 340. Integral with this sprocket there is a grooved collar 342 into which a yoke 343 extends to hold the sprocket against movement axially of the shaft. Adjacent the sprocket 341 there is a bushing 344 also keyed to the shaft by spline 340. A sprocket 345 is rotatably mounted on bushing 344. It is provided with three holes 346, Fig. 23, placed forty-five degrees apart. A stud 347 may be projected through one of these three holes into a tapped hole in sprocket 341, thereby permitting adjustment of chain 324 with respect to chain 325.

A sprocket 348 similar to sprocket 341 is also keyed to shaft 320 in reversed arrangement. Its grooved collar 349 is engaged by a yoke on a bar 350 which extends along the conveyor to shaft 321, where it has a yoke for engagement with the sprocket on that shaft corresponding to sprocket 348. Bar 350 is operatively connected with a nut 351 which is threadably mounted on a cross shaft 352 journaled in the side frame members 353 and 354 of the conveyor. A similar shaft carrying a similar nut is journaled in the frame members near the opposite end of the conveyor. These two shafts are connected by an endless chain 355 which runs upon like sprockets keyed to the two threaded shafts. Hand wheel 356 on shaft 352 may be turned in one direction or the other to move bar 350 laterally, thereby varying the position of sprocket 348 and the corresponding sprocket on shaft 320. A sprocket 357 similar to sprocket 345 is angularly adjustable relative to sprocket 348 by spaced holes in sprocket 357 and a stud 358 threaded into sprocket 348. The corresponding sprockets on shaft 320 being locked together against relative movement axially, the rotation of hand wheel 356 causes the pair of chains 322 and 323 to be adjusted toward and away from the other pair.

Figure 23:
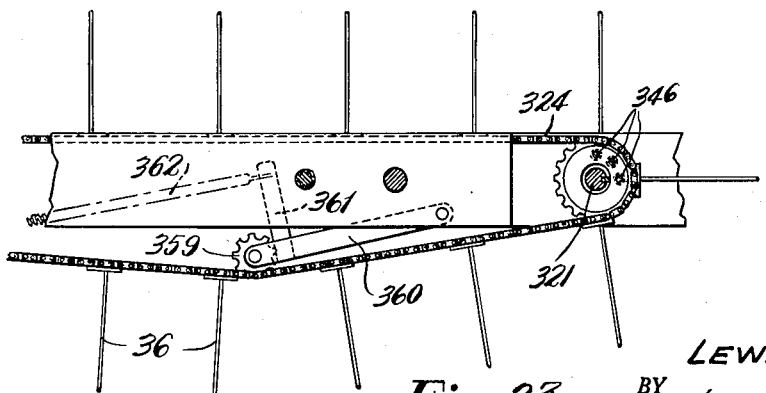
Fig. 23 is a similar view taken substantially on the line 23—23 of Fig. 21.

Chains 323, 324 and 325 are provided with a considerable amount of slack, as indicated in Fig. 23. An idler sprocket 359 engages each said chain, being mounted on the free end of an arm 360 pivoted to a frame member and having a post 361 to which is secured a tension spring 362 which maintains the chains under stress. The chain 322 is somewhat longer in order to extend over a fixed idler sprocket 363 and a movable idler sprocket 364 on the end of an arm 365 pivoted to a frame member and biased by a coil spring 366 to maintain the chain under tension. This latter arrangement enables the operator to lift chain 322 from its sprockets on shafts 320 and 321 and advance or retard it with respect to those sprockets for adjustment purposes in order to obtain the relation of pins shown in Fig. 27.

On shaft 320 there is secured an eight lobed cam 367 in which there is a threaded hole 368. A four lobed cam 369 and a two lobed cam 370 are also supplied with the machine. These latter cams are slotted, as indicated at 371 and are provided with holes 372. The cam 367 may be used alone or in combination with one or the other of the cams 369 and 370 for masking part of the lobes of cam 367. The additional cam may be added or removed quickly, since the slot 371 may slide over the shaft from a lateral position and a stud may be projected through the hole 372 and threaded into tapped hole 368.

A lever 374 having a right angled end 373 is pivoted at 375 to a lever 502 which is mounted on a pivot 503 carried by the machine frame. The position of the pivot 375 may be adjusted by manipulation of the lever 502. In order to make this adjustment relatively fine the arrangement disclosed in Fig. 19 may be employed. Here an adjusting screw 504 extends with clearance through a hole in frame member 505. It is provided with a knurled head 506 which bears against the frame member. The threaded end of the screw extends through a tapped hole in lever 502, and a coil spring 507 biases the upper end of the lever toward the left. Obviously manipulation of this screw will swing lever 502 through a small arc. Lever 374 is urged upwardly by a link 376 pivotally connected between lever 374 and a lever 377 which is pinned to a shaft 378 that is oscillatably journaled in the frame. A coil spring 379 attached to the rear end of lever 377 tends to exert an upward pull on link 376, thereby maintaining the free end of lever 374 against the perimeter of cam 367, and one of the two cams 369 and 370 if used.

On the shaft 378 two forwardly extending arms are secured by means of clamps 380 and 381 which carry at their free ends two relatively wide triggers 382 and 383 which are adapted to engage the posts 36 near the end of their upward travel around shaft 320. When however the low spots in the cams permit the lever 374 to rise temporarily the spring 379 swings shaft 378 counterclockwise as viewed in Fig. 18, which lifts the triggers 382 and 383 and permits the posts to snap forward. This forward snapping of the posts is due to the fact that after the upper ends of the posts engage the triggers the blocks upon which they are carried move forward slowly with the chains which are pulled forward by the sprockets on shaft 321. The upper runs of the chains are taut, the slack being taken up in the lower runs by the springs 362 and 366. Therefore when the triggers release the posts they snap forward sharply.

After the collated units travel downwardly between the belts 290 and 291 and are released by the opening of grippers 316, 317, they drop onto a table 385 supported by the frame members 353 and 354, the table having slots through which the posts travel. The collated units drop onto the table behind the pair of posts which were the last to be snapped forward. The number of units so deposited in the pockets between pairs of posts is dependent upon the rate of travel of the chains, which may be regulated by the means heretofore described. The collated units are thus collected in groups which may be removed by an operator seated alongside of the delivery table. All of the groups contain the same number of units which provides a convenient means for counting the product of the machine and packing the units in containers for shipment to purchasers. It will be observed that by variations in the arrangement of cam plates 367, 369 and 370 the posts may be snapped forward twice, four times or eight times per revolution of shaft 320. Generally this will correspond to the chain arrangements illustrated respectively in Figs. 25, 26 and 27.

In order that each unit as it is deposited on the delivery conveyor table may be forced forwardly against the posts next in advance of the downward path of the units, I provide a pair of air nozzles the positions of which are indicated at 386 in Fig. 5. A blower 387 supplies air to these nozzles constantly through flexible conductors 388.

*Control circuits.*—Referring now to Fig. 28, 394, 395 and 396 represent a three wire power circuit. A master switch 393 may be closed to admit current to the main motor 143. Suction motor 154 may take current from lines 394, 395 and 396 controlled by a switch 399, and blower motor 155 takes current from wires 394 and 395 under control of a switch 400. When switch 393 is closed, motor 143 starts, turning the wheel 34 and operating the envelope and card feeding mechanisms and the delivery mechanism.

Now assuming that the drive for the envelope feed is operating at low speed, and that the pressure of the envelopes against the lever 195 has decreased below a predetermined minimum, then spring 196 will swing the lever clockwise as viewed in Fig. 28 to close normally open switch 199. This will set up a circuit through a relay 442 from wire 394 through a conductor 443 to the coil of the relay, through a conductor 444 to normally closed switch 198, through now closed switch 199 and back through conductors 445, 426 and 428 to wire 395. The energization of relay 442 sets up a holding circuit for the relay which includes conductor 443, the relay coil, conductor 444, switch 198, conductor 446, relay armature 447, conductor 448 and conductors 445, 426 and 428. At the same time a circuit is completed through solenoid 173, via conductor 443, relay armature 449 and conductor 450 to the solenoid and back through conductors 451, 445, 426 and 428. Lever 171 is thereby swung to shift the drive from the low speed train to the high speed train. Drive at high speed then continues while lever 195 gradually turns counterclockwise owing to the increasing pressure of the envelopes in the faster moving conveyor. When finally lever 195 reaches and operates switch 198 the holding circuit through relay 442 will be broken and the solenoid 173 deenergized, whereupon the spring 170 will operate lever 171 to return the drive to the low speed train.

Referring now to the speed control for the card feed, switch 268 is open when the normal low speed drive is in operation. When, after operation for a period at low speed, the pressure of the cards at the forward end of the conveyor decreases below a predetermined minimum, spring 247 will act to withdraw plunger 251 from engagement with stop 253 and cam 254 will then turn step by step as previously described. The first ratcheting movement will push plunger 265 to the left, as viewed in Fig. 28, closing switch 268. This will function to set up a circuit through a conductor 453, the coil of a relay 454, and conductors 455, 426 and 428 to one side of the line, and from the line through conductors 425, 427 and 456 back to switch 268. The energization of relay 454 will result in a circuit from wire 395 through conductors 428, 426, 455 and 457 through armature 458 of the relay, conductor 459 to solenoid 176 and from that solenoid through conductors 461, 427, and 425 back to line wire 394. Lever 177 is thus swung over against the action of spring 179 to shift the drive from the low speed train to the high speed train, where it remains through at least one revolution of the cam 254. The ratcheting movement of the cam preferably acts to advance the cam one step for each one-twelfth revolution of wheel 34, which I term one cycle of the machine. If at the end of the twelfth actuation of the cam the plunger 251 has been returned by the increased pressure of the pack of cards into the path of the stop 253, further rotation of cam 254 will be prevented and the plunger 251 riding down into the low spot of the cam will open switch 268, thereby opening the circuit through relay 454 and breaking the circuit through solenoid 176. Spring 179 will then swing the lever 177 into position to disconnect the high speed train and connect the low speed train. If however the pressure in the card pack is still insufficient to return plunger 251 into the path of stop 253, rotation of cam 254 will continue and switch 268 will be closed during another revolution of the cam. Hunting action by the change speed mechanism is thereby avoided.

Having thus described my invention, I claim:

1. In a machine of the character described, a conveyor for sheets stacked on edge, supporting plates normally disposed to one side of said conveyor moving with said conveyor and adapted to be projected into the space above said conveyor during operation of the machine for supporting the stack at intervals, and means for adjusting said conveyor and said plates relatively toward or away from each other.

2. In a machine of the character described, a conveyor adapted to support the bottom edges of sheets stacked on edge thereon, an impeller disposed to one side of said conveyor moving parallel therewith at the same speed, said impeller carrying at intervals plates adapted to be drawn into the space above said conveyor behind sheets carried thereon for assisting in the feeding of the stack forward and for maintaining the sheets in substantially vertical planes, and means for adjusting said impeller up and down relative to said conveyor.

3. In a machine of the character described, an endless conveyor member adapted to support a stack of sheets on edge and feed them forward, an endless chain impeller member mounted above and laterally of said conveyor member, said impeller member carrying a series of guides disposed at right angles to the impeller member, plates slidable in said guides adapted to be manually drawn out of the guides into position over the conveyor member means for driving said conveyor member and said impeller member at the same rate of speed, and means for adjusting one of said members up and down relative to the other.

4. Mechanism as defined in claim 3, characterized in that automatic means are provided for returning any withdrawn plates into their guides as the latter approach the forward end of their travel.

5. Mechanism as defined in claim 3, characterized in that means is provided effective throughout the range of reative adjustment of said members for transmitting drive from one member to the other.

6. Mechanism as defined in claim 3, characterized in that one of said members is bodily adjustable up and down toward and away from the other member, means effective throughout the range of said adjustment for transmitting drive from one member to the other, said means comprising a sprocket operatively associated with each of said members, a pair of links pivotally mounted at their outer ends about the axes of said sprockets, a floating shaft forming a pivot for the inner ends of said links, two sprockets keyed to said shaft, and an endless chain extending from each of said last named sprockets to one of said first named sprockets.

7. In a machine of the character described, means for advancing a pack of sheets, a feeler arranged to contact the foremost sheet of the pack and biased to press against said sheet, a rotary cam, an electric switch, means associated with said cam for actuating said switch and holding it in actuated position through a predetermined angle of rotation of the cam, a rotary ratchet, a yieldable driving connection between said ratchet and said cam, stop means for holding said cam against rotation by said ratchet, means responsive to movement of said feeler by pressure from said pack for withdrawing said stop means, pawl means functioning with each cycle of the machine for advancing said ratchet step by step, and means responsive to actuation of said switch and operating on said pack advancing means for increasing the pressure of said pack against said feeler.

8. A machine as defined in claim 7, comprising high and low gear driving means for advancing the pack of sheets, means for selecting high or low gear driving means, and wherein said means responsive to actuation of said switch functions to operate said gear selecting means to vary the rate at which the pack is advanced.

9. In a machine of the character described, means for advancing a pack of sheets comprising a normally operating low speed gear train and a normally inoperative high speed gear train, a feeler arranged to contact the foremost sheet of the pack and biased to press against said sheet, a rotary cam, stop means for holding said cam against rotation, an electric switch, connections between said cam and switch for holding the switch open when said stop means is in operative position, said cam functioning through said connections for holding the switch closed through a predetermined angle of rotation of the cam from said stopped position, a rotary ratchet, a yieldable driving connection between said ratchet and said cam, means responsive to movement of said feeler under pressure from said pack for withdrawing said stop means, pawl means functioning with each cycle of the machine for advancing said ratchet step by step, and means responsive to the closing of said switch for selecting said high speed gear train and to the opening of said switch for selecting said low speed gear train.

10. In a machine of the character described, means for advancing a pack of sheets, a feeler lever arranged to contact the foremost sheet of the pack and biased to press against said sheet, a normally open electric switch and a normally closed electric switch, one arm of said feeler lever being interposed between said switches and adapted to operate each of them, a relay in circuit with said normally closed switch and said normally open switch, a locking circuit for said relay through said normally closed switch, electric means for influencing the action of said pack advancing means to increase the pressure of said pack against said feeler lever, a circuit for said electrical means controlled by said relay, said feeler lever being arranged to close said normally open switch when the pressure of said pack of sheets against said feeler lever decreases to a predetermined extent, the circuit for said electrical means remaining closed until the pressure of said pack of sheets against said feeler lever increases sufficiently to operate the lever to open said normally closed switch, thereby breaking the relay circuit and consequently the circuit through said electrical means.

11. In a machine of the character described, means for advancing a pack of sheets comprising a normally operating low speed gear train and a normally inoperative high speed gear train, a feeler lever arranged to contact the foremost sheet of the pack and biased to press against said sheet, a normally open electric switch and a normally closed electric switch, one arm of said feeler lever being interposed between said switches and adapted to operate each of them, a relay in circuit with said normally closed switch and said normally open switch, a locking circuit for said relay through said normally closed switch, electrical means for throwing said high speed gear train into operation and disconnecting said low speed train, a circuit for said electrical means controlled by said relay, said feeler lever being arranged to close said normally open switch when the pressure of said pack of sheets against said feeler lever decreases to a predetermined extent, the circuit for said electrical means remaining closed until the pressure of said pack of sheets against said feeler lever increases sufficiently to operate the lever to open said normally closed switch, thereby breaking the relay circuit and consequently the circuit through said electrical means.

12. In a machine of the character described, a conveyor adapted to support the bottom edges of sheets stacked on edge, means for raising and lowering said conveyor bodily whereby the upper edges of sheets of various heights may be brought to a predetermined level, an impeller disposed to one side of said conveyor moving parallel therewith at the same speed, said impeller carrying at intervals plates adapted to be drawn into the space above said conveyor behind sheets carried thereon for assisting in the feeding of the stack forward and for maintaining the sheets in substantially vertical planes, and means for adjusting said impeller up and down relative to said conveyor, whereby the height of said plates may be caused to maintain a given relation to said predetermined level throughout the vertical adjustment of said conveyor.

References Cited in the file of this patent

UNITED STATES PATENTS

| Number | Name | Date |
|---|---|---|
| 1,043,401 | Cox | Nov. 5, 1912 |
| 1,116,513 | Tapley | Nov. 10, 1914 |
| 1,586,544 | White | June 7, 1926 |
| 1,645,555 | Taylor | Oct. 18, 1927 |
| 1,689,668 | Gray | Oct. 30, 1928 |
| 1,833,311 | Winkler | Nov. 24, 1931 |
| 1,979,253 | Coy | Nov. 6, 1934 |
| 2,138,306 | Patrick | Nov. 29, 1938 |
| 2,191,586 | Richard | Feb. 27, 1940 |
| 2,220,073 | Belcher | Nov. 5, 1940 |
| 2,361,907 | Baker | Nov. 7, 1944 |
| 2,532,626 | Kleineberg | Dec. 5, 1950 |
| 2,554,579 | Lauffer | May 29, 1951 |
| 2,572,509 | Novich | Oct. 23, 1951 |
| 2,684,848 | Pearce | July 27, 1954 |